United States Patent [19]
Hernandez

[11] Patent Number: 4,481,536
[45] Date of Patent: Nov. 6, 1984

[54] TELETEXT SYSTEM FOR DISPLAYING DATA ON THE SCREEN OF A TELEVISION RECEIVER

[75] Inventor: Charles Hernandez, Villejuif, France

[73] Assignee: Compagnie Continentale de Signalisation, Orly, France

[21] Appl. No.: 382,236

[22] Filed: May 26, 1982

[51] Int. Cl.³ .............................................. H04N 7/04
[52] U.S. Cl. .................................................... 358/147
[58] Field of Search ......................................... 358/147

[56] References Cited

U.S. PATENT DOCUMENTS 4,321,596 3/1982 Hernandez et al. ................ 358/147

Primary Examiner—John C. Martin
Assistant Examiner—Michael D. Parker
Attorney, Agent, or Firm—Holman & Stern

[57] ABSTRACT

The data are received in a demodulator and then are grouped into data packets at the output of a demultiplexer. The demultiplexer is connected to the demodulator by phasing flip flops. Gates are provided for returning the flip flop to zero and for cutting off transmission of the data from the demodulator to the demultiplexer during reception of the television raster frame.

3 Claims, 2 Drawing Figures

TELETEXT SYSTEM FOR DISPLAYING DATA ON THE SCREEN OF A TELEVISION RECEIVER

The present invention relates to a teletext system for displaying data on the screen of a television receiver from data diffused by an emitter station in the form of multiplexed channels, each channel, or magazine, being segmented into pages composed of data packets which, at reception, are recorded in an image store, are read by a character generator and are displayed on the screen of the television receiver.

The invention relates more particularly to the reception of teletext data, i.e. the acceptance unit, or decoder.

The system carrying out the "Antiope" process is already known.

In this display process, at reception, the data to be displayed, which were transmitted with the analog television images, are firstly received and demodulated, then they are grouped into data packets from which the characters to be displayed are defined, before the display of these characters on a television receiver is effectively controlled.

Demodulation is effected during the whole reception of the television raster frame. Consequently, the analog image transmitted, according to the patterns of this image, may sometimes present characteristics which may be confused with those of the data packets, which, in this case, introduces an error at data packet group level, detrimental to correct functioning of the display system. This is a major drawback designated under the name of "negative loss".

U.S. Pat. Nos. 3,982,065 and 3,891,792 already disclose systems in which data transmission is prohibited outside of the raster frame return intervals.

The man skilled in the art is thus led to propose a system in which the acquisition and display of data are effected only during acquisition windows, corresponding to the raster frame return intervals, consequently without risk of confusing them with the analog television images. In other words, this is a system which makes it possible to filter and block in time the transmission of the data to be displayed. However, the prior arts mentioned above provide no teaching on the production of these acquisition windows in a system exploiting the Antiope process and taking into account the pre-existing elements of this system. This is what is proposed by the present invention.

The invention therefore relates to a teletext system comprising, at reception, a data demodulator, a demultiplexer connected to the demodulator, means for defining the characters to be displayed, means for displaying these characters on the television screen, and means for controlling these display means.

According to the invention, this system is characterized in that the demodulator and the demultiplexer are connected via phasing flip flops, and it also comprises means adapted to produce data transmission windows and to cut off transmission of the data from the demodulator to the demultiplexer outside these transmission windows, comprising a first gate adapted to return these flip flops to zero, this first gate being controlled by means for controlling the display means, and a second gate, for the passage of a clock signal furnished by the demodulator, this second gate being controlled by the first gate.

The invention will be more readily understood on reading the following description with reference to the accompanying drawings, in which.

Figure 1:
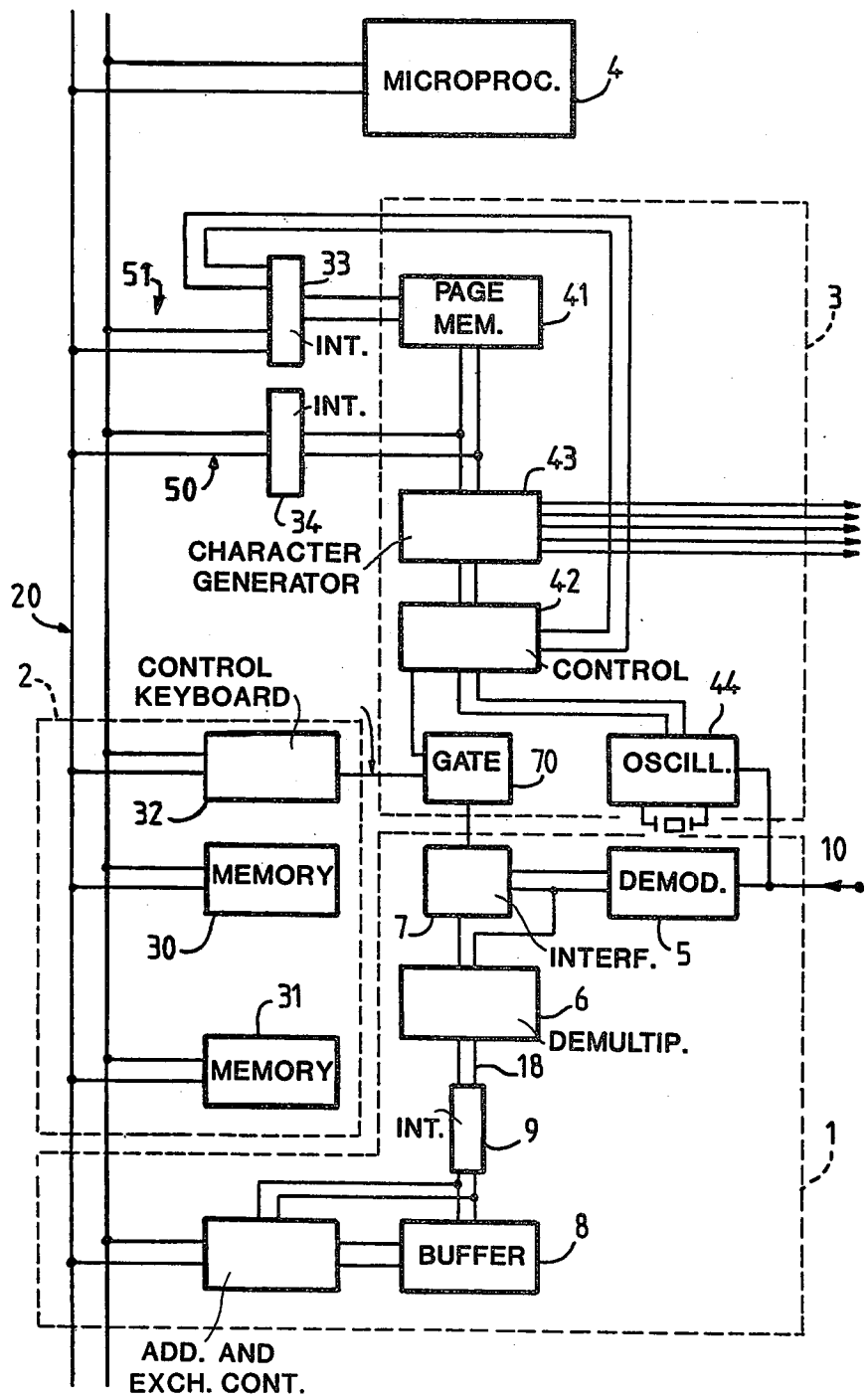
FIG. 1 shows a block diagram of the decoder of the invention.

Referring now to the drawings, the system shown in FIG. 1 comprises a data acquisition unit 1, a decoding and display control unit 2, a display unit 3 and a microprocessor 4.

The acquisition unit 1 comprises a demodulator 5, a demultiplexer 6, an interface 7, between the demodulator 5 and the demultiplexer 6, a buffer 8, and an interface 9 between the demultiplexer 6 and the buffer 8.

Figure 2:
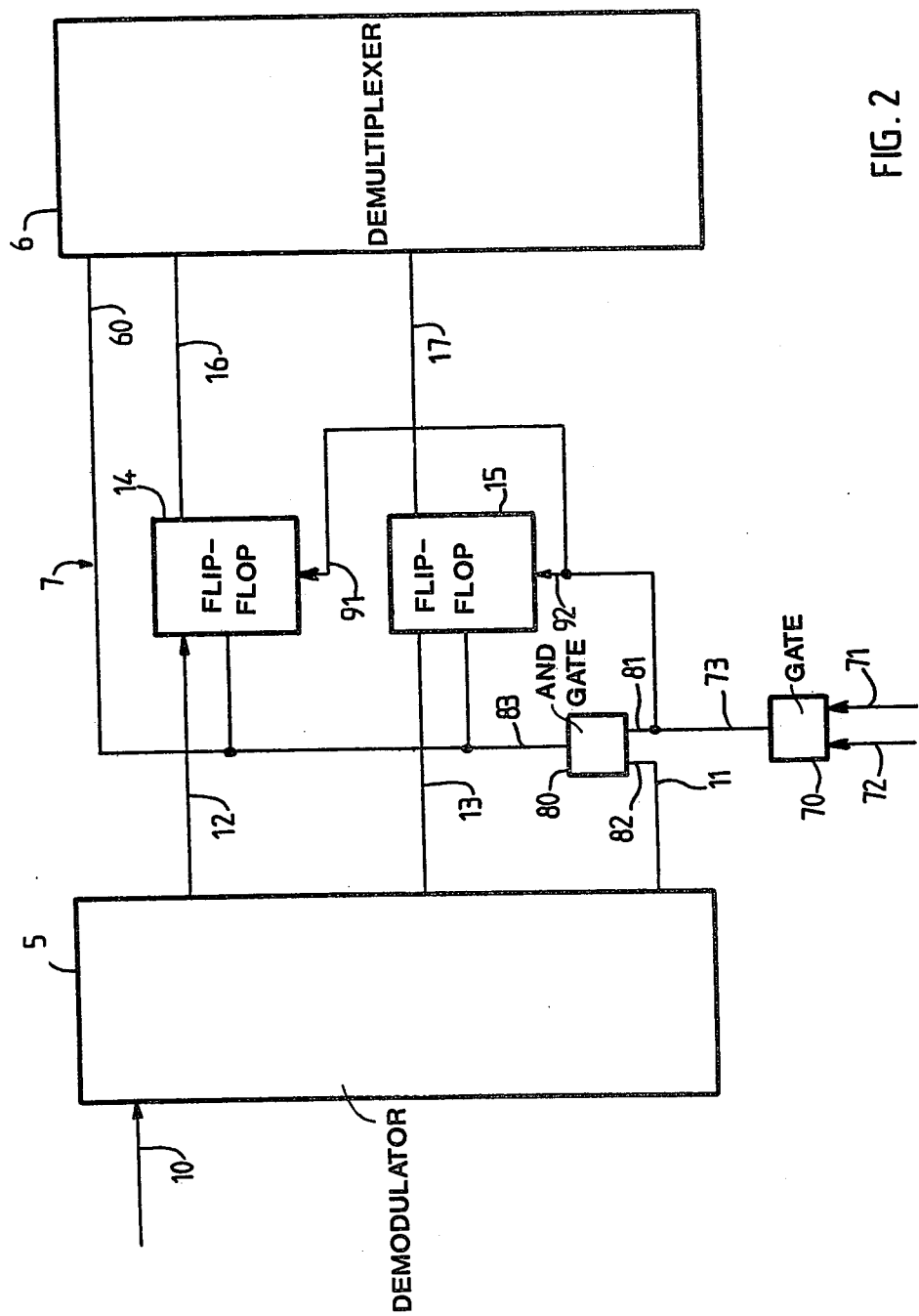
FIG. 2 shows a block diagram of the transmission cut-off means of the decoder of FIG. 1.

The demodulator 5 receives at 10 the incident video signal supporting the packets of data to be displayed of a digital channel multiplexed with the video channel, i.e. the television image. It delivers (FIG. 2), at 11, a clock signal furnished by a reception oscillator, integrated with the demodulator, and synchronized on the emission clock signal by synchronization salvos, at 12, the data to be displayed disposed in series, at 13, a data packet start recognition signal, as well as a line synchronization signal and a composite synchronization signal (lines and raster frames).

Before being received by the demultiplexer 6, the series data as well as the data packet recognition signal are phased respectively by two flip flops 14 and 15 forming the interface 7 and controlled by the clock signal delivered at 11. The flip flops 14 and 15 deliver to the demultiplexer 6, at 16 and 17, respectively, the series data and the phased packet recognition signal. In addition, and as will be seen hereinafter in detail, the flip flops 14 and 15 receive on their return to zero input a signal inhibiting or enabling the transmission of data. The demultiplexer 6 also receives at 60 the clock signal delivered at 11.

The demultiplexer 6 therefore receives from the demodulator 5 the series data as well as the packet recognition signal, from which it covers, at 18 (FIG. 1), the data packets in the form of octets belonging to a digital channel, which data will then be decoded then displayed. In other words, the demultiplexer 6 acts as a generator of data packets which are then transferred into the buffer 8.

The buffer 8, connected to the demultiplexer 6 by the adaptation interface 9 which, in the case in question, is a phase shift register, therefore receives the data grouped in packets. In the preferred embodiment of the Antiope system, the buffer is a storage assembly of 2K octets. This memory is associated with an address and exchange control circuit 19, connected to the multiplexer 6 via the interface 9, and to the data bus 20 of the decoding unit 2 of the system.

The decoding unit 2 comprises, connected to the bus 20, a program-containing read only memory 30, containing decoding algorithms, a read/write memory 31, making it possible temporarily to store variables taken into account with the decoding algorithms, a control keyboard 32, with its conventional interface for connection to the bus 20.

The decoding unit 2 is adapted to operate around the microprocessor 4, which recovers the data from the buffer 8 of the acquisition unit 1, as a function of the algorithms of the ROM or PROM 30, and which introduces them into a page memory, which will be described hereinafter, of the display unit 3.

The display unit 3 performs the function of an image memory which is fulfilled by the microprocessor 4 and which is read at the television scan rate. It comprises a page memory 41, a counting chain 42, a character generator 43 and an oscillator 44.

The page memory 41, in the preferred embodiment constituted by the Antiope system, is a storage assembly with a capacity of 2K octets, organised in 1024 words of 16 binary elements. It contains the characters to be displayed as well as their attributes, such as their dimensions and colour. It is connected to the character generator 43 directly and to the counting chain 42 and to the bus 20 by an adaptation interface 33 having the role of a multiplexer.

The counting chain 42 makes it possible, from a clock signal synchronized on the emission clock signal, which thus phases it, to count the characters, via 40 characters per row, in the case in question, the television scanning lines, or 10 scanning lines per row of characters, in the case in question, and the rows of characters, viz. 25 rows per television raster frame in the case considered of a 625 line standard (21 rows for 525 lines).

The counting chain 42 furnishes the read-out addresses of the page memory 41, either in form xy or in binary form, making it possible to send the data read in the page memory 41 into the character generator 43. In this way, at a given instant, an address is furnished to the page memory 41 which furnishes to the character generator 43 the data corresponding to the code and to the attributes of the character to be displayed.

The oscillator 44 furnishes the basic clock signal to the counting chain 42, to which it is connected. Its period is characteristic of the dimensions of the elementary point of the character matrix. This clock is produced by a quartz oscillator, controlled by a phase loop servo-controlled on the synchronization signal of the incident video received by the demodulator 5, in order to ensure synchronization between the generation of addresses by the counting chain 42 and the video signal.

The character generator 43, which therefore receives the data of the page memory 41 (character codes, attributes), produces the colour video signal (red, green, blue), the composite synchronization signals and the switching signals intended for the television receiver.

The decoding unit 2 is connected to the display unit 3 via the bus 20, a data bus 50, connected between the bus 20 and the character generator 43 via a switching interface 34, and an address bus 51, connected between the bus 20 and the interface 33 of the page memory 41.

The acquisition (1), decoding (2) and display (3) units and the microprocessor 4 are interconnected by the bus 20, or service bus, and the data bus 50 and address bus 51.

Two gates 70 and 80 are in addition provided, only gate 70 being shown in FIG. 1, for reasons of clarity.

Gate 70 is a gate, or a set of gates, which receives on its two inputs 71 and 72, respectively, a data transmission or acquisition window signal, and an enabling signal. The window signal is delivered by the counting chain 42, servo-controlled by the oscillator 44 on the video signal, during the raster frame return intervals. The enabling signal is delivered for example by the control keyboard 32, as a functioon of algorithms exploiting the ROM or PROM 30, to allow passage of the window signal through the gate 70.

The gate 70 performs a function which may be illustrated by the following table:

| input 71 | input 72 | output 73 |
|----------|----------|-----------|
| 1        | 1        | 1         |
| 1        | 0        | 1         |
| 0        | 1        | 0         |
| 0        | 0        | 1         |

This function may, for example, be fulfilled by an OR gate and an inverter connected between the input 72 and one of the inputs of the OR gate.

In fact, it is clear that, when diffusion of the digital data to be displayed takes place on a specialized channel, without analog images or, better, without analog images which may be confused with these data, as for example in the case of the transmission of a test pattern, the invention is no longer justified and the grouping of the digital data in packets is effected during the whole raster frame period. In this case, it is therefore necessary not to allow passage of the window signal.

In the preferred embodiment constituted by the Antiope system, the negative loss is avoided by an acquisition window present, for the standard of 625 interlaced lines, from line 6 to line 22, for the even raster frames, and from line 319 to line 335 for the odd raster frames, and for the standard of 525 lines, from line 10 to line 21 for the even and odd raster frames. For the standard of 625 interlaced lines, the window signal is produced by a flip flop set by the line counter of the chain 42 mentioned above, at the moment of line 6 for the even raster frames, and of line 319 for the odd raster frames, and unset by this same counter, at the moment of line 22 for the even raster frames and 335 for the odd raster frames.

The output 73 of the gate 70 is connected on the one hand to gate 80, by one, 81, of its two inputs 81 and 82, and on the other hand to the inputs 91 and 92 for returning the flip flops 14 and 15 to zero. The input 82 of the gate 80 receives the clock signal delivered by the demodulator 5. The output 83 of gate 80 is connected to the control inputs of the flip flops 14 and 15 and to the demultiplexer 6, at 60. The gate 80 is an AND gate whose states may be represented by the following table:

| input 81 | input 82 | output 83 |
|----------|----------|-----------|
| 1        | 1        | 1         |
| 1        | 0        | 0         |
| 0        | 1        | 0         |
| 0        | 0        | 0         |

Of course, it would be just as simple to provide for the counting chain to deliver a cut-off window signal instead of a transmission window signal.

With this acquisition window signal, the flip flops 14 and 15 are in the zero state outside of the raster frame return intervals, during which the data packets can therefore not be covered by the demultiplexer, transmission between the demodulator 5 and the demultiplexer 6 being cut off. It will be noted that, outside these raster frame return intervals, the clock signal of the demodulator is not transmitted to the flips flops 14 and 15 or to the demultiplexer 6 either. A cut-off at the level of one of the three outputs 11, 12 and 13 of the demodulator 5 would of course suffice. However, this redundancy is easy to obtain.

The logic structures described hereinabove have been given by way of example and others may, of course, be envisaged.

What is claimed is:

1. Teletext system for displaying data, diffused in the form of multiplexed channels, on the screen of a television receiver, comprising, at reception, a data demodulator, a demultiplexer connected to the demodulator, means containing the characters to be displayed connected to means for displaying these characters on the television screen and to means for controlling these display means, the demodulator and the demultiplexer being connected via phasing flip flops, and means adapted to produce data transmission windows and to cut off transmission of data from the demodulator to the demultiplexer outside these transmission windows, comprising a first gate adapted to return the flip flops to zero, this first gate being controlled by means for controlling the display means and a second gate, for the passage of a clock signal furnished by the demodulator, this second gate being controlled by the first gate.

2. The system of claim 1, wherein the first gate for returning the flip flops to zero is also controlled by an enabling signal furnished by a control keyboard.

3. The system of one of claims 1 and 2, wherein the first gate comprises an OR gate and an inverter connected in series, and the second gate is an AND gate.

* * * * *